(12) United States Patent
Ichieda

(10) Patent No.: US 8,269,874 B2
(45) Date of Patent: Sep. 18, 2012

(54) IMAGE DISPLAY SYSTEM, IMAGE INPUT APPARATUS AND CONTROLLING METHOD

(75) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 257 days.

(21) Appl. No.: 12/693,917

(22) Filed: Jan. 26, 2010

(65) Prior Publication Data

US 2010/0188550 A1    Jul. 29, 2010

(30) Foreign Application Priority Data

Jan. 27, 2009   (JP) .................................. 2009-015072

(51) Int. Cl.
*H04N 5/222* (2006.01)
*H04N 5/225* (2006.01)
*G03B 21/08* (2006.01)
*G03B 21/26* (2006.01)
*G03B 21/06* (2006.01)
*G03B 21/00* (2006.01)
*G03B 19/18* (2006.01)

(52) U.S. Cl. ................... 348/333.01; 348/373; 348/375; 353/63; 353/35; 353/65; 353/122; 352/136; 352/138

(58) Field of Classification Search .............. 353/63–67, 353/122, 35; 348/373, 333.1, 375; 352/67, 352/176, 138, 203
See application file for complete search history.

(56) References Cited

U.S. PATENT DOCUMENTS

| | | | |
|---|---|---|---|
| 2005/0088543 A1* | 4/2005 | Yoshii | 348/239 |
| 2007/0028127 A1* | 2/2007 | Kim | 713/310 |
| 2007/0242300 A1* | 10/2007 | Inai | 358/1.14 |

FOREIGN PATENT DOCUMENTS

JP   A-2004-104341   4/2004

* cited by examiner

*Primary Examiner* — Sinh Tran
*Assistant Examiner* — Mark Monk
(74) *Attorney, Agent, or Firm* — Oliff & Berridge, PLC

(57) ABSTRACT

An image display system includes: an image input apparatus and an image display apparatus connected thereto that displays an image obtained. The image input apparatus includes an image pickup unit, a movable holding unit selectively brought into an imaging state or a non-imaging state and a state detection unit. A control unit brings the image input apparatus and the image display apparatus into a disconnected state where a transmission path for transferring data between the image input apparatus and the image display apparatus is logically disconnected when in the non-imaging state, and brings the image input apparatus and the image display apparatus into a connected state when in the imaging state.

20 Claims, 8 Drawing Sheets

IMAGE DISPLAY SYSTEM, IMAGE INPUT APPARATUS AND CONTROLLING METHOD

CROSS-REFERENCE

The entire disclosure of Japanese Patent Application No. 2009-015072 filed on Jan. 27, 2009 is expressly incorporated by reference herein.

BACKGROUND

1. Technical Field

The present invention relates to an image display system including an image input apparatus and an image display apparatus, an image input apparatus and a controlling method for an image input apparatus.

2. Related Art

In recent years, a projector and a document camera are effectively utilized in presentations or the like, in which an image imaged by the document camera is projected by the projector. It is required for the projector and the document camera to be portable. Therefore, in the document camera in the related art, an arm unit can be folded as disclosed in JP-A-2004-104341.

However, when the document camera in the related art is connected with a projector by using a USB cable with the arm unit being folded, there arises a problem that a video which is imaged with the arm unit being folded and not desired by a user is projected on a screen.

SUMMARY

An advantage of some aspects of the invention is to prevent a video not desired by a user from being displayed.

The invention can be implemented as the following embodiments or application examples.

A first aspect of the invention is directed to an image display system including: an image input apparatus; an image display apparatus that is connected with the image input apparatus and displays an image obtained by the image input apparatus, the image input apparatus including an image pickup unit that images a subject, a movable holding unit that holds the image pickup unit and can be selectively brought into an imaging state where the subject can be imaged and a non-imaging state where the subject is not imaged, and a state detection unit that detects whether the movable holding unit is in the imaging state or the non-imaging state; and a control unit that brings the image input apparatus and the image display apparatus into a disconnected state where a transmission path for transferring data between the image input apparatus and the image display apparatus is logically disconnected when the state detection unit determines that the movable holding unit is in the non-imaging state, and brings the image input apparatus and the image display apparatus into a connected state where the transmission path is logically connected when the state detection unit determines that the movable holding unit is in the imaging state.

In the image display system according to the first aspect of the invention, a worker moves the movable holding unit in the image input apparatus, thereby being capable of switching the movable holding unit between the imaging state where the subject can be imaged and the non-imaging state where the subject is not imaged. The state detection unit detects in which of the states the movable holding unit is. When it is determined that the movable holding unit is in the non-imaging state, the control unit brings the image input apparatus and the image display apparatus into the disconnected state where they are logically disconnected from each other. Therefore, even if the image pickup unit outputs a meaningless image signal when the movable holding unit is in the non-imaging state, an image is not transmitted to the image display apparatus. Accordingly, it is possible to prevent an image not desired by a user from being displayed.

Connecting the image input apparatus and the image display apparatus with a USB cable can provide an image display system that is easy to set up and is more convenient. In addition, switching between the connected state and the disconnected state can be done only by connecting/disconnecting the pull-up resistor connected to the data line of the USB cable, resulting in a simple configuration. Since the control is performed on the data line, whether the image display apparatus and the image input apparatus are in the connected state or the disconnected state can be reliably determined, so that the controllability is high.

After the image input apparatus and the image display apparatus are switched to the connected state, communication therebetween is immediately established, so that the workability is excellent.

When the standby state determination unit that determines whether or not the image display apparatus is in the standby state is provided so as to automatically switch the image display apparatus to an on state in the case where the image display apparatus is in the standby state after the image input apparatus and the image display apparatus are switched to the connected state, it is possible to provide an image display system more excellent in workability.

The image display system according to the first aspect of the invention can be applied to a document camera and a projector. In such an image display system, a material such as an original document or sample can be easily imaged by the document camera, and the imaged image can be projected by the projector. Therefore, lectures at school or presentations can be more attractive.

A second aspect of the invention is directed to an image input apparatus that inputs an image and causes an image display apparatus to display the image. The image input apparatus includes: an image pickup unit that images a subject; a movable holding unit that holds the image pickup unit and can be selectively brought into an imaging state where the subject can be imaged and a non-imaging state where the subject is not imaged; a state detection unit that detects whether the movable holding unit is in the imaging state or the non-imaging state; and a control unit that brings the image input apparatus and the image display apparatus into a disconnected state where a transmission path for transferring data between the image input apparatus and the image display apparatus is logically disconnected when the state detection unit determines that the movable holding unit is in the non-imaging state, and brings the image input apparatus and the image display apparatus into a connected state where the transmission path is logically connected when the state detection unit determines that the movable holding unit is in the imaging state.

Similarly to the above-described image display system, the image input apparatus according to the second aspect of the invention does not transmit an image to the image display apparatus even if the image pickup unit outputs a meaningless image signal when the movable holding unit is in the non-imaging state, thereby providing an effect that it is possible to prevent an image not desired by a user from being displayed.

A third aspect of the invention is directed to a method for controlling an image input apparatus that inputs an image and causes an image display apparatus to display the image. The controlling method includes: providing an image pickup unit that images a subject; providing a movable holding unit that holds the image pickup unit and can be selectively brought into an imaging state where the subject can be imaged and a non-imaging state where the subject is not imaged; determining whether the movable holding unit is in the imaging state or the non-imaging state; and bringing the image input apparatus and the image display apparatus into a disconnected state where a transmission path for transferring data between the image input apparatus and the image display apparatus is logically disconnected when it is determined that the movable holding unit is in the non-imaging state, and bringing the image input apparatus and the image display apparatus into a connected state where the transmission path is logically connected when it is determined that the movable holding unit is in the imaging state.

Similarly to the above-described image display system, the image input apparatus to which the control method according the third aspect of the invention is applied does not transmit an image to the image display apparatus even if the image pickup unit outputs a meaningless image signal when the movable holding unit is in the non-imaging state, thereby providing an effect that it is possible to prevent an image not desired by a user from being displayed.

The control method according to the third aspect of the invention may further include providing a connecting unit that connects the mage input apparatus and the image display apparatus with a USB cable. By using the image input apparatus to which the control method is applied and the image display apparatus, an effect equivalent to that of the above-described image display system can be provided.

As an image display apparatus of another application example, the constituent element of the above-described image display system may be added to the image input apparatus.

The invention can be implemented in various forms. For example, the invention can be implemented in the form of a method for realizing each of the units of the image input apparatus or the image display apparatus, a computer program for realizing each of the units, a recording medium on which the computer program is recorded, a data signal including the computer program and realized in a carrier wave, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

1. Configuration of Hardware

Figure 1:
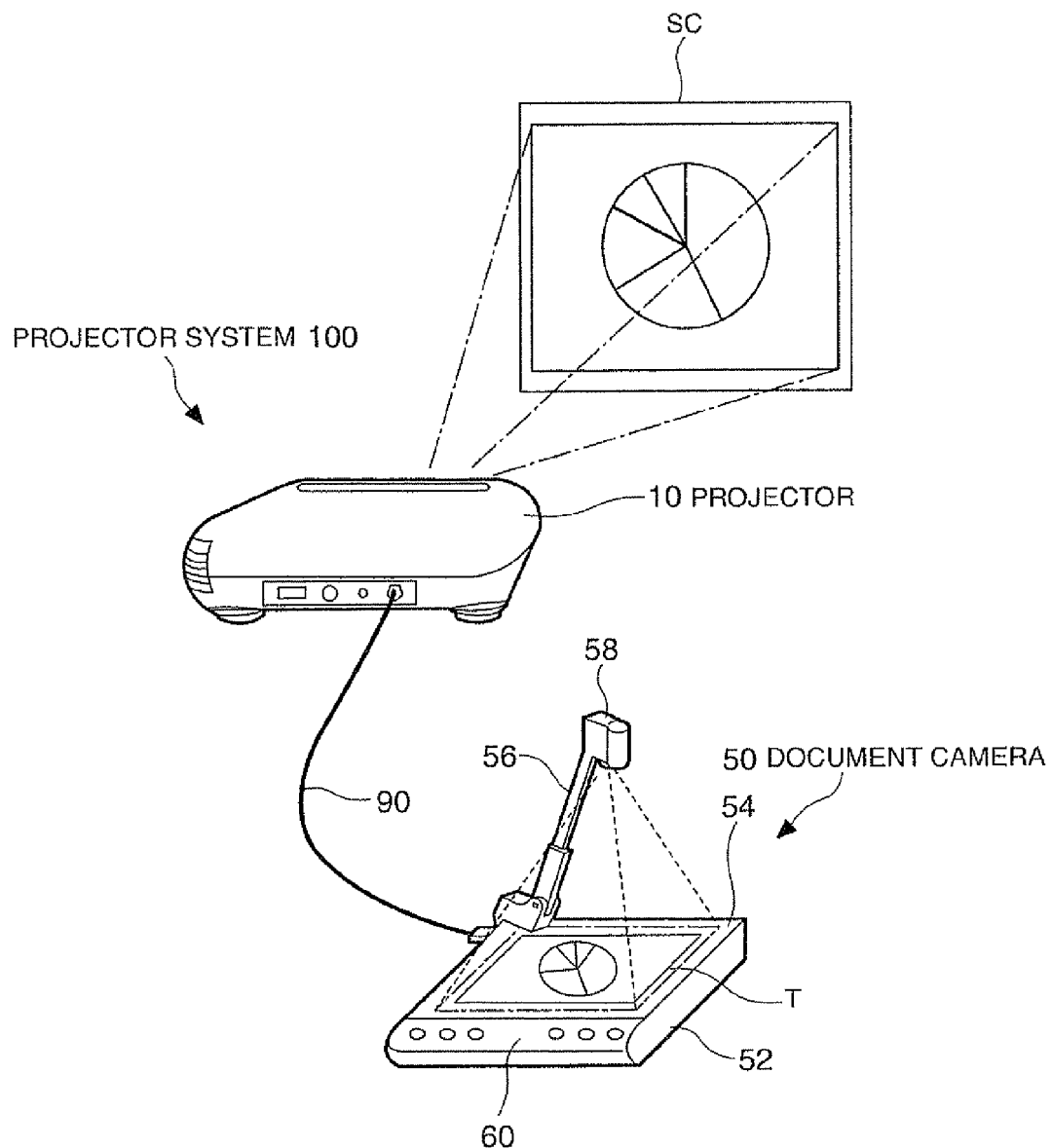
FIG. 1 is an explanatory view showing a schematic configuration of a projector system as an embodiment of the invention.

FIG. 1 is an explanatory view showing schematic configuration of a projector system as an embodiment of the invention. As shown in the drawing, a projector system 100 includes a projector 10 and a document camera 50 connected to the projector 10. The projector 10 and the document camera 50 are connected to each other via a USE cable 90. An image imaged by the document camera 50 is displayed (projected) on a screen SC by using the projector 10. The "image" as used herein may be a still image or a moving image (that is, video). In the embodiment, the document camera 50 acquires a video.

Figure 2:
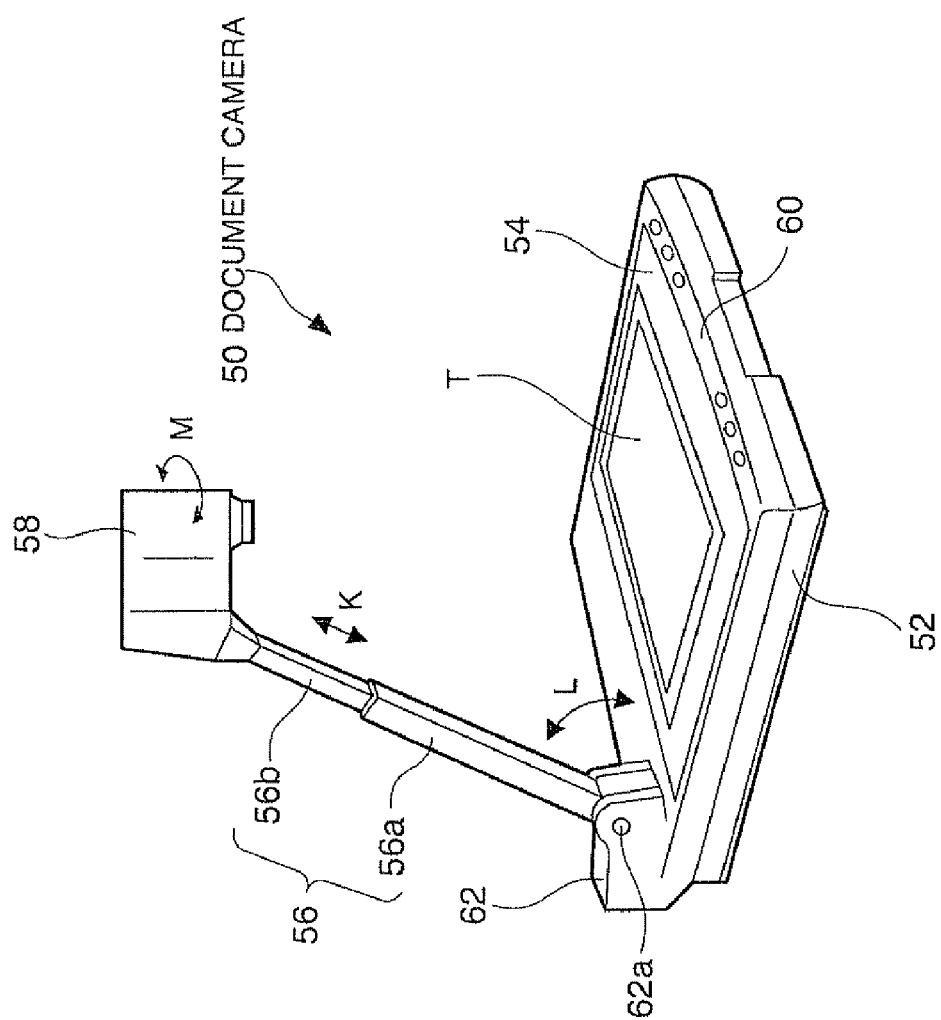
FIG. 2 is a perspective view of a document camera in an imaging state.

FIG. 2 is a perspective view of the document camera 50. As shown in the drawing, the document camera includes a base 52, a stage 54, an arm 56, a camera head 58, and an operating panel 60. The stage 54 is disposed on the base 52. A subject T such as a sheet of paper (original document, etc.) on which characters or pictures are illustrated or a three-dimensional object is placed on the stage 54.

The arm 56 holds the camera head 58. The arm 56 includes a lower arm 56a and an upper arm 56b. The lower arm 56a and the upper arm 56b are extendable and contractible in an axial direction (K direction in the drawing). The lower arm 56a is mounted on an arm mounting unit 62 disposed at one of the four corners of the base rotatably in an L direction in the drawing with a rotation axis 62a being as the rotation center.

The camera head 58 is coupled to the distal end of the upper arm 56b. Specifically, the camera head 58 is coupled to the upper arm 56b rotatably around the axis of the upper arm 56b (M direction in the drawing). The camera head 58 includes a lens, an LED, and a photoelectric conversion element such as a CCD. By adjusting moving positions in the K direction, the L direction, and the M direction, a user can direct the camera head 58 toward a direction suitable for imaging the subject T placed on the stage 54. The state where the subject T can be imaged, that is, the state shown in FIG. 2 is a state where the arm 56 is expanded.

The operating panel 60 includes a plurality of buttons (button switches) and receives an operational instruction from a user to the document camera 50.

Figure 3:
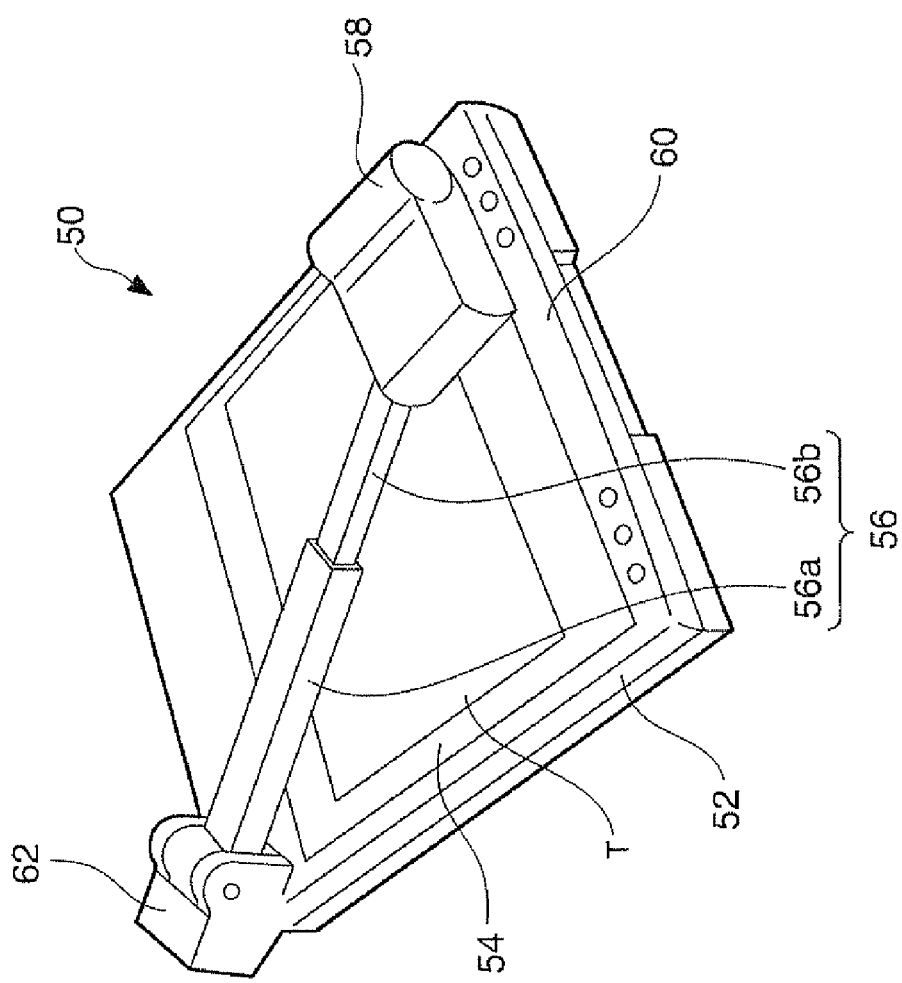
FIG. 3 is a perspective view of the document camera in a non-imaging state.

As described above, since the document camera 50 of the embodiment is adjustable in moving position in the K direction, the L direction, and the M direction, the arm 56 and the camera head 58 can be folded from an imaging state in FIG. 2 to a state in FIG. 3. That is, in FIG. 2, the camera head 58 is rotated backward in the M direction in the drawing. Then, the upper arm 56b is pushed into the lower arm 56a (downward in the K direction in the drawing), so that the entire length of the arm 56 is shortened. Subsequently, the arm 56 is lowered downward in the L direction in the drawing. As a result, the arm 56 and the camera head 58 of the document camera 50 can be folded as shown in FIG. 3. The folded state is hereinafter referred to as "non-imaging state". In the non-imaging state, since the arm 56 and the camera head 58 are lowered, the height of the document camera 50 is shortened.

According to the document camera 50 having the configuration, the subject T placed on the stage 54 is imaged in the imaging state shown in FIG. 2, and an image signal showing an image obtained by imaging is output to the projector 10. After finishing the use of the document camera 50, a user folds the arm 56 and the camera head 58 to bring them into the non-imaging state of FIG. 3 and stores them.

Figure 4:
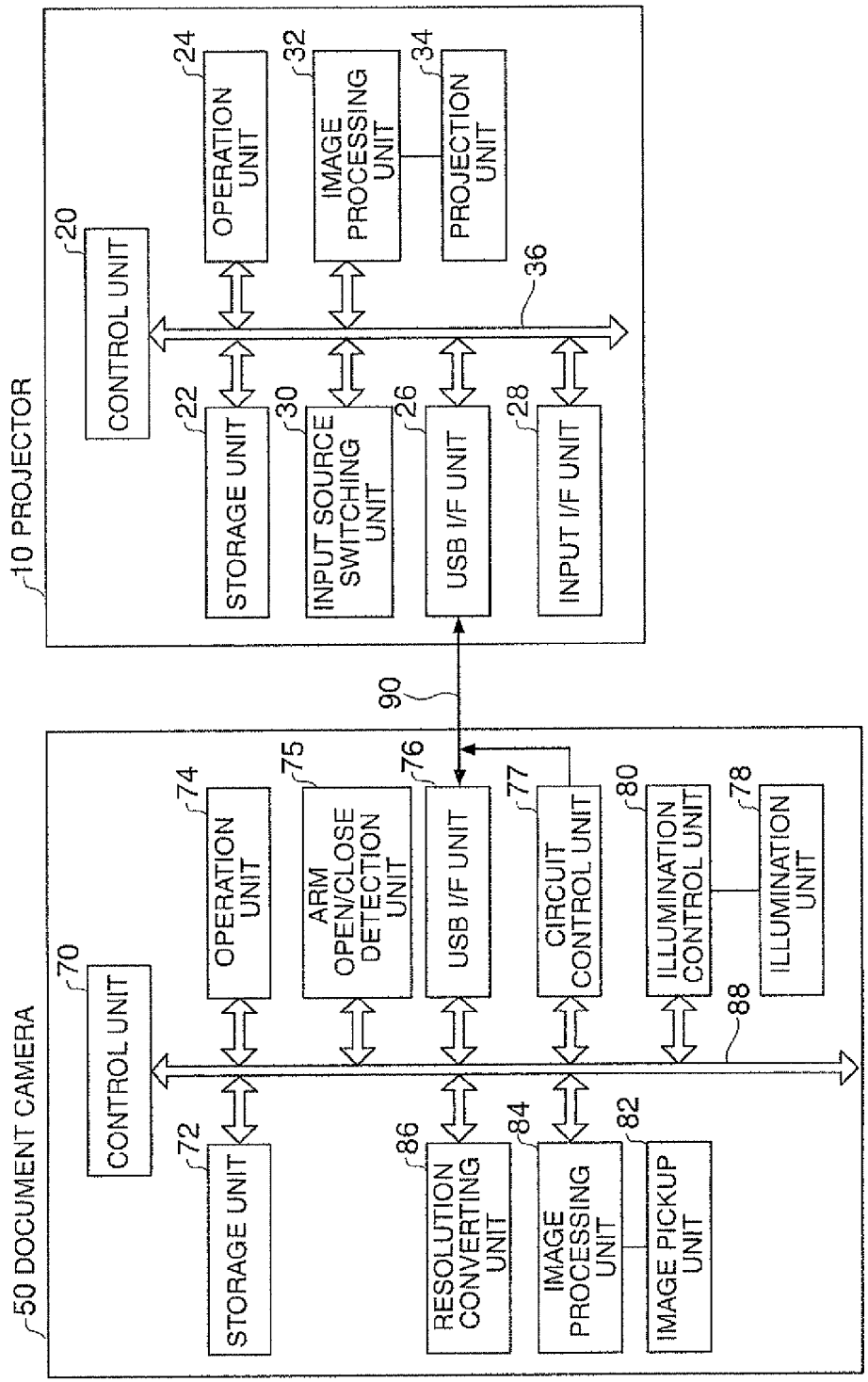
FIG. 4 is an explanatory view showing internal configurations of a projector and the document camera.

FIG. 4 is an explanatory view showing internal configurations of the projector 10 and the document camera 50. As shown in the drawing, the projector 10 includes a control unit 20, a storage unit 22, an operation unit 24, a USB interface unit 26, an input interface unit 28, an input source switching unit 30, an image processor 32, and a projection unit 34. Numeral reference 36 denotes a bus, which connects the control unit 20 with each of the units 22 to 32 excluding the projection unit 34.

The control unit 20 is composed of a CPU, a digital signal processor (DSP), and the like and operates in accordance with computer programs stored in the storage unit 22 to control each of the units 22 to 32. The storage unit 22 stores image data and various kinds of computer programs. As the various kinds of computer programs, a well-known USB module, USB video class driver, and image display program, a program for connection process described later, and the like are stored.

The operation unit 24 receives an operational instruction from a user to the projector 10, including an operating panel (not shown) and a remote control light-receiving unit (not shown). The operating panel and the remote control each include an input source switching button (not shown) for switching input sources for an image to be displayed by the projector 10.

The USB interface unit 26 serves for transferring control data, image data, or the like with external equipment in accordance with a universal serial bus (USB) standard. In the embodiment, the document camera 50 is connected with the USB interface unit 26 via the USB cable 90.

The input interface unit 28 includes interfaces for transferring control data and image data with external equipment other than USB. In this case, the input interface unit 28 includes a RGB interface, a video interface, and an S-video interface. The use of the input interface unit 28 enables the connection with an image input apparatus other than the document camera 50, such as a video tape recorder (VTR) or DVD player, for example.

The input source switching unit 30 selects one of interfaces among the USB interface unit 26 and each of the interfaces provided in the input interface unit 28, thereby switching input sources for an image to be displayed by the projector 10.

Figure 8:
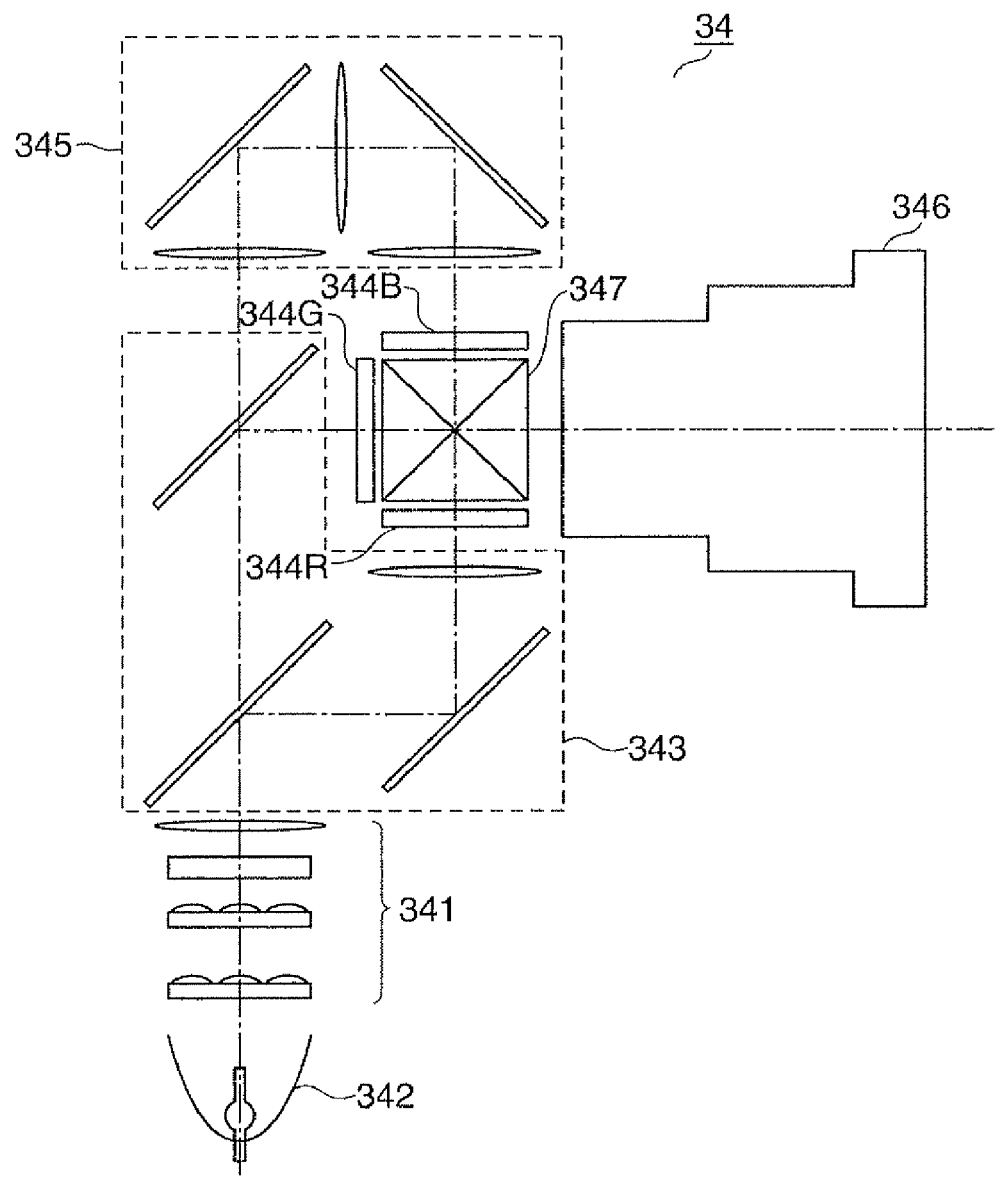
FIG. 8 is a diagram illustrating the internal configuration of a projection unit of the projector.

The image processor 32 generates display image data for image display on the basis of the image data or video data input from the interface selected by the input source switching unit 30. As shown in FIG. 8, the projection unit 34 includes a light source 342, light modulators 344 (344R, 344G, and 344B), a projection lens 346, a lighting optical system 341, a color separating optical system 343, a relay optical system 345, and a synthesis optical system 347. The projector 10 according to this embodiment includes a transmissive liquid crystal panel as the light modulators 344. White light emitted from the light source 342 is separated into a red beam, a green beam, and a blue beam while passing through the lighting optical system 341, the color separating optical system 343, and the relay optical system 345, and the separated beams are modulated by the light modulators 344 on the basis of the display image data generated by the image processor 32 and are incident on the synthesis optical system 347. The color image beams modulated by the light modulators 344 are synthesized by the synthesis optical system 347 and the synthesized image light is projected from the projection lens 346. The synthesis optical system 347 can be constructed by a dichroic prism or the like.

The document camera 50 includes a control unit 70, a storage unit 72, an operation unit 74, an arm open/close detection unit 75, a USB interface unit 76, a circuit control unit 77, an illumination unit 78, an illumination control unit 80, an image pickup unit 82, an image processing unit 84, and a resolution converting unit 86. Numeral reference 88 denotes a bus, which connects the control unit 70 with each of the units 72 to 76, 80, 84, and 86 excluding the illumination unit 78 and the image pickup unit 82.

The control unit 70 is composed of a CPU and the like and operates in accordance with computer programs stored in the storage unit 72 to control each of the units 70 to 86 provided in the document camera 50. The storage unit 72 stores image data and various kinds of computer programs. As the various kinds of computer programs, a well-known USB module and USB class driver, a program for switching connection/disconnection described later, and the like are stored. The operation unit 74 receives an operational instruction from a user to the document camera 50, including the operating panel 60 (FIG. 1) provided in the document camera 50.

The arm open/close detection unit 75 corresponding to a state detection unit of the invention is a switch built in the arm mounting unit 62 and detects whether the lower arm 56a is at a position of the imaging state or at a position of the non-imaging state. The detection may be carried out with a mechanical one such as a push button or with a non-contact one such as a magnetic sensor. That is, the arm open/close detection unit 75 may be a sensor of any type as long as it can detect whether the lower arm 56a is at the position at the time of the imaging state or at the position at the time of the non-imaging state.

Further, instead of the configuration that detects the state of the lower arm 56a, the arm open/close detection unit 75 may have a configuration that detects a state where the upper arm 56b is inserted into the lower arm 56a at a maximum, that is, a state where the entire length of the arm 56 becomes shortest. This configuration detects the arm 56 in the non-imaging state based on the state where the upper arm 56b is inserted into the lower arm 56a at a maximum. In short, the arm open/close detection unit 75 may have any configuration as long as it can detect whether the arm 56 is in the imaging state or the non-imaging state.

Returning to FIG. 4, the USB interface unit 76 serves for transferring control data, image data, or the like with external equipment in accordance with the USB standard. In the embodiment, the USB interface unit 76 is connected with the USB interface unit 26 of the projector 10 via the USB cable 90. The circuit control unit 77 controls the logical connection of a data line between the document camera 50 and the projector 10 while keeping the physical connection between the document camera 50 and the projector 10 via the USB cable 90.

The illumination unit 78 is a light source, such as an LED, irradiating the subject T with light. The illumination control unit 80 controls the on and off or the like of the illumination unit 78. The image pickup unit 82 includes a photoelectric conversion element such as a CCD and a drive unit performing an automatic exposure (AE)/auto focus (AF) control. The image pickup unit 82 is built in the camera head 58 (FIG. 1). The image processing unit 84 applies image processing such as white balance on an image signal showing an image obtained by the image pickup unit 82. The resolution converting unit 86 converts the resolution of the image obtained by the image pickup unit 82 to a resolution requested by the projector 10. The request of the projector 10 is sent from the projector 10 via the USB I/F unit 76.

The document camera 50 is configured so as to receive supply of power from the projector 10 side via the USB cable 90. The power is supplied via a power supply line of the USB cable 90.

The projector 10 and the document camera 50 both configured as described above operate as follows to display an image of the subject T (FIG. 1). That is, on the document camera 50 side, when the control unit 70 confirms the connection with the projector 10 via the USB I/F unit 76, the control unit 70 controls the illumination control unit 80, the image processing unit 84, and the resolution converting unit 86 to thereby image the subject T placed on the stage 54 (FIG. 1), and temporarily store an image signal (image data) obtained by imaging in the storage unit 72. Thereafter, the control unit 70 transmits the image signal stored in the storage unit 72 to the projector 10 side via the USB I/F unit 76.

On the projector 10 side, the control unit 20 receives the image signal sent from the document camera 50 via the USB I/F unit 26. The control unit 20 controls the image processor 32 to thereby generate display image data based on the received image signal. As a result, projection light that is light-modulated based on the display image data is projected by the projection unit 34. As a result, the image of the subject T is displayed on the screen SC (FIG. 1). Further in the embodiment, the document camera 50 operates the circuit control unit to control the logical connection of a data line between the document camera 50 and the projector 10.

Figure 5:
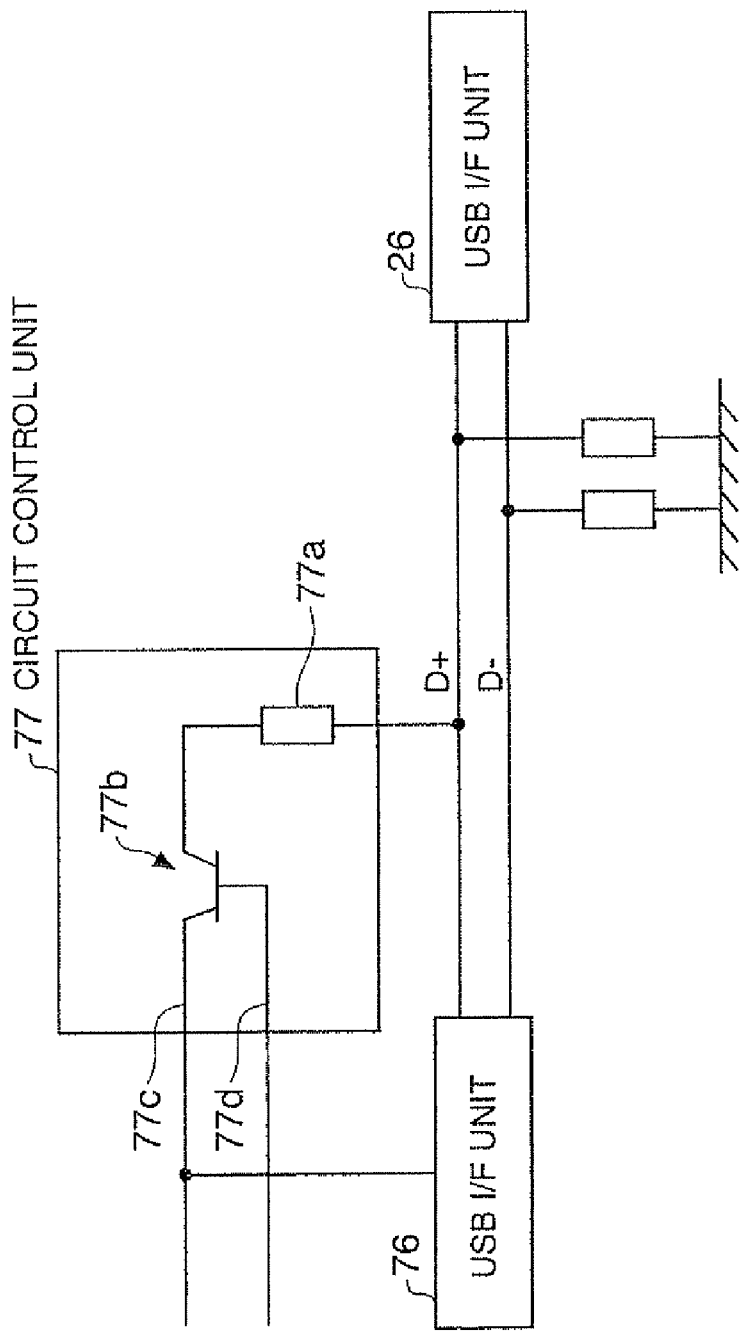
FIG. 5 is an explanatory view showing a configuration of a circuit control unit.

FIG. 5 is an explanatory view showing the configuration of the circuit control unit 77. As shown in the drawing, the circuit control unit 77 includes a pull-up resistor 77a, a switch element 77b, a power supply line 77c, and a signal line 77d. The pull-up resistor 77a is connected to a data line D+ of the USB cable 90. The power supply line 77c applies a predetermined voltage to the pull-up resistor 77a via the switch element 77b. The signal line 77d inputs a predetermined control signal to the switch element 77b to control the on and off of the switch element 77b.

When an on signal is input to the signal line 77d to bring the switch element 77b into an on state, voltage is applied to the pull-up resistor 77a (the pull-up resistor 77a is connected), so that voltage is supplied to the data line D+. Thus, the data line D+ is at a high level set in accordance with the USB standard, whereby the document camera 50 and the projector 10 are brought into a connected state where the data line is logically connected therebetween. Hereinafter, the connected state is referred to as "data line connected state".

On the other hand, when an off signal is input to the signal line 77d to bring the switch element 77b into an off state, the supply of voltage to the pull-up resistor 77a is stopped (the pull-up resistor 77a is disconnected), so that voltages of both the data lines D+ and D− are at a low level. Thus, the document camera 50 and the projector 10 are brought into a disconnected state where the data line is logically disconnected therebetween. Hereinafter, the disconnected state is referred to as "data line disconnected state".

The signal line 77d for controlling the on and off of the switch element 77b is connected with the control unit 70 of the document cameral 50, so that the switch element 77b is on/off controlled by the control unit 70. That is, the document camera 50 and the projector 10 are switched between the data line connected state and the data line disconnected state by the control unit 70. The connection/disconnection switching process will be described in detail below.

2. Configuration of Software

Figure 6:
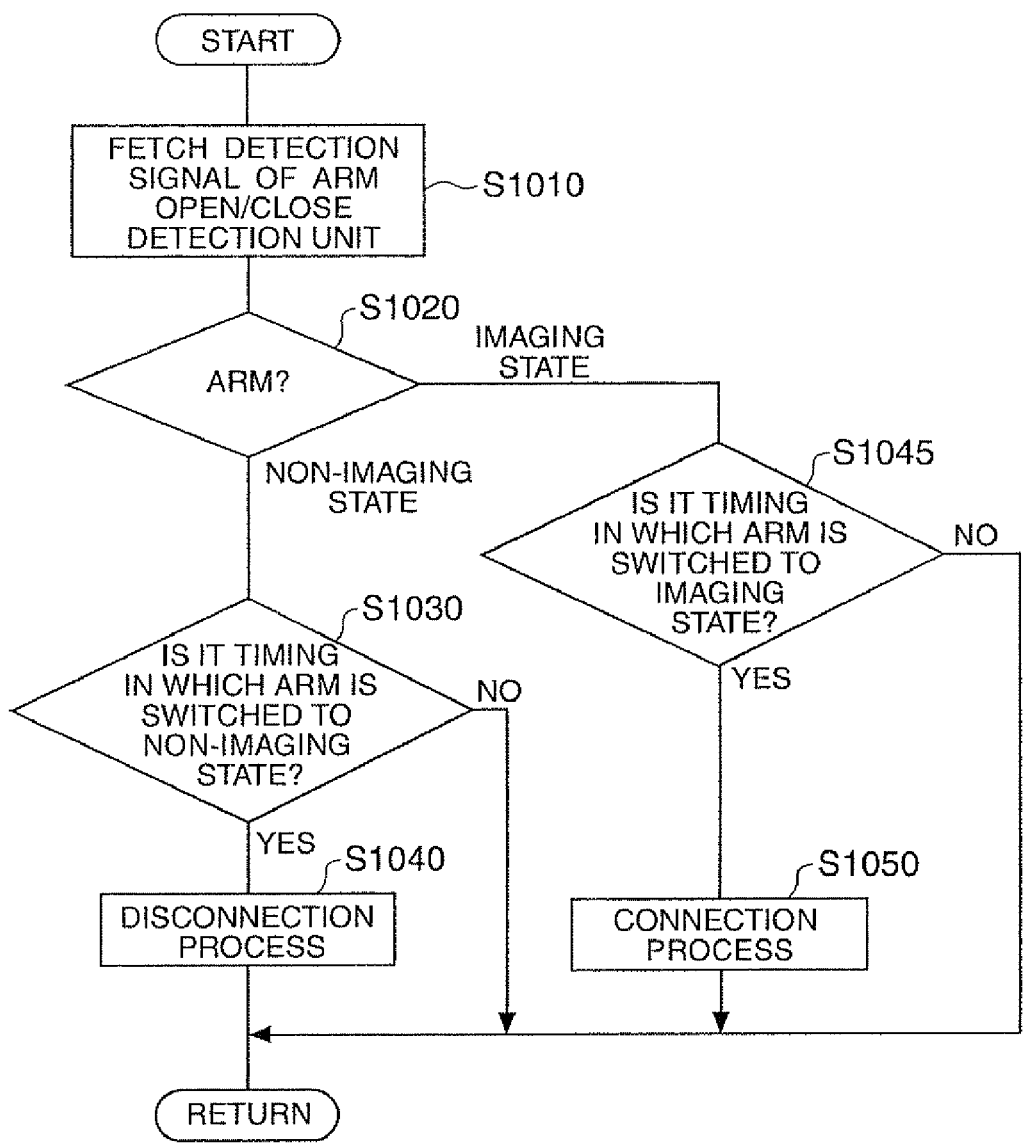
FIG. 6 is a flowchart showing a connection/disconnection switching process.

FIG. 6 is a flowchart showing the connection/disconnection switching process. The connection/disconnection switching process is executed by the control unit 70 of the document camera 50 and executed repeatedly every predetermined time.

When the process is started, the control unit 70 fetches a detection signal from the arm open/close detection unit 75 (Step S1010) and determines whether the arm 56 is in the imaging state or the non-imaging state based on the detection signal (Step S1020). When it is determined that the arm 56 is in the non-imaging state, the control unit 70 detects whether or not the non-imaging state is detected for the first time to determine whether it is a timing in which the arm is switched to the non-imaging state (Step S1030). When the arm 56 is switched from the imaging state to the non-imaging state, or the USE cable 90 is connected while the arm 56 is in the non-imaging state, the control unit 70 controls the circuit control unit 77 to disconnect the pull-up resistor 77a connected to the data line D+ of the USB cable 90 from the power supply line 77c, so that the document camera 50 and the projector 10 are brought into the data line disconnected state (disconnection process: Step S1040). After the execution of Step S1040, the flow goes to "return", and the connection/disconnection switching process is temporarily ended. On the other hand, when it is determined in Step S1030 that it is not the timing in which the arm 56 is switched to the non-imaging state, the flow also goes to "return", and the connection/disconnection switching process is temporarily ended.

On the other hand, when it is determined in Step S1020 that the arm 56 is in the imaging state, the control unit 70 detects whether or not the imaging state is detected for the first time to determine whether it is a timing in which the arm is switched to the imaging state (Step S1045). When the arm 56 is switched from the non-imaging state to the imaging state, or the USB cable 90 is connected while the arm 56 is in the imaging state, it is determined in Step S1045 that it is the timing in which the arm 56 is switched to the imaging state. The control unit 70 (i) controls the circuit control unit 77 to connect the pull-up resistor 77a connected to the data line D+ of the USE cable 90 with the power supply line 77c, so that the document camera 50 and the projector 10 are brought into the data line connected state, and (ii) thereafter executes a process at the time of connection described later (connection process: Step S1050). After the execution of Step S1050, the flow goes to "return", and the connection/disconnection switching process is temporarily ended.

When it is determined in Step S1030 that it is not the timing in which the arm 56 is switched to the non-imaging state, or when it is determined in Step S1045 that it is not the timing in which the arm 56 is switched to the imaging state, the flow goes to "return", and the connection/disconnection switching process is temporarily ended.

Figure 7:
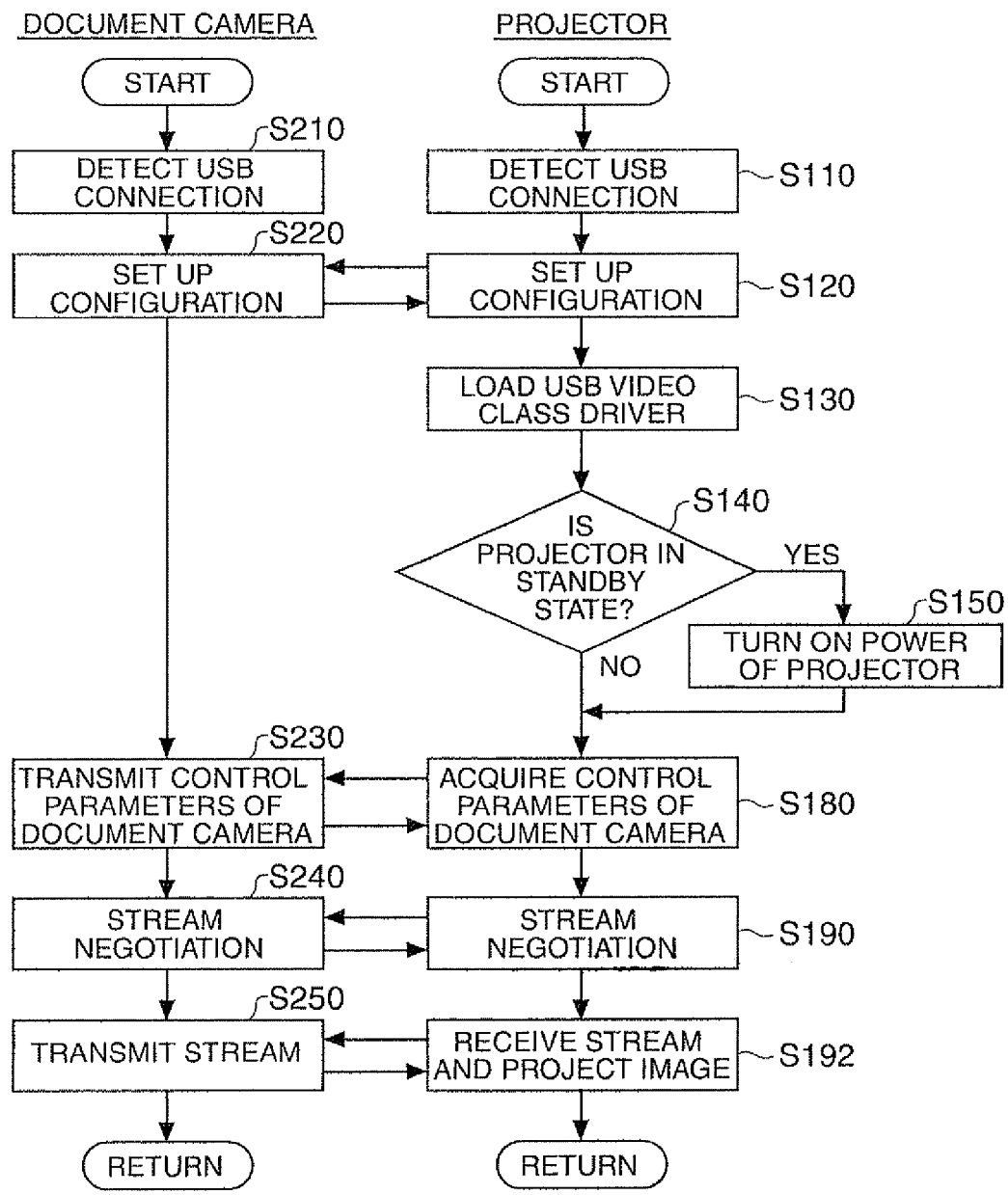
FIG. 7 is a flowchart showing a process at the time of connection executed in respective control units of the projector and the document camera.

FIG. 7 is a flowchart showing the process at the time of connection executed in the respective control units 20 and 70 of the projector 10 and the document camera 50. In the drawing, the process at the time of connection in the control unit 20 of the projector 10 is shown on the right, while the process at the time of connection in the control unit 70 of the document camera 50 is shown on the left. The execution of each of the processes at the time of connection is started when the data line is logically connected between the projector 10 and the document camera 50. That is, in the document camera 50, the process at the time of connection is executed in the connection process in Step S1050 of the connection/disconnection switching process (FIG. 6).

When the process is started, each of the control units 20 and 70 (hereinafter referred to as "projector control unit" and "document camera control unit", respectively) first performs a process for detecting the connection between the projector 10 and the document camera 50 via the USB (Steps S110 and S210). In the process, the connection between the USB interface unit 26 of the projector 10 and the USB interface unit 76 of the document camera 50 is detected by using a USB cable 62. When the connection is not detected, each of the control units 20 and 70 waits until the connection is detected.

When the USB connection is detected, each of the control units 20 and 70 next sets up a configuration (Steps S120 and 220). Specifically, the projector control unit 20 requests a descriptor from the document camera 50. In response to the request, the document camera control unit 70 gives the projector 10 the descriptor. The projector control unit 20 acquires the descriptor sent from the document camera 50.

The descriptor includes a configuration descriptor indicating that the document camera 50 operates as an apparatus conforming to the USB standard. The configuration descriptor includes a list of functions that can be controlled by the projector 10 among the functions of the document camera 50, the resolution of frame to be supported, and the format (MJPEG/YUV) of frame to be supported.

The configuration setting in Steps S120 and S220 is actually made in the course of enumeration that starts execution after detecting the USB connection. That is, actually the enumeration process conforming to the USB standard is performed. However, the flowchart shown in the drawing illustrates only the configuration setting as a key component.

When the configuration is set up, the projector control unit 20 loads a USB video class driver (Step S130). Specifically, the projector control unit 20 detects that the document camera 50 conforms to the USB video device class from device class information included in the descriptor and loads the USB video class driver. By using the loaded USB video class driver as needed, the following process is executed.

After the execution of Step S130, the projector control unit 20 determines whether or not the projector 10 is in a standby state (Step S140). When the projector 10 is in the standby state, the power of the projector 10 is turned on (Step S150). After the execution of Step S150, the process proceeds to Step S180. When it is determined in Step S140 that the projector 10 is not in the standby state, that is, the power of the projector 10 is turned on, the processing proceeds to Step S180.

In Step S180, the projector control unit 20 performs a process for acquiring control parameters of the document camera 50. In the process, the projector control unit 20 requests various control parameters from the document camera 50 and acquires the various control parameters sent from the document camera 50 in response to the request. The control parameters are, for example, the setting range values (Min/Max) of functions (zoom, contrast adjustment, brightness adjustment, etc.) of the document camera 50 that can be controlled by the projector 10, the current setting values of the functions, and the like. These control parameters are used as needed for a not-shown process on the projector 10 side.

When receiving the request of the control parameters from the projector control unit 20, the document camera control unit 70 transmits the control parameters to the projector 10 in response to the request (Step S230).

After the execution of Step S180, the projector control unit 20 performs a stream negotiation process (Step S190). The "stream negotiation" as used herein means a process for setting the projector 10 based on the configuration descriptor acquired in Step S120. The document camera control unit 70 performs the stream negotiation process in a similar manner while communicating with the projector control unit 20 (Step S240). Specifically, in the processes in Steps S190 and S240, conditions for sending stream (image data), such as frame resolution, frame format, interval, and band width, are established.

After the execution of Step S240, the document camera control unit 70 transmits stream under the conditions established in Step S240 (Step S250). After the execution of Step S190, the projector control unit 20 requests the transmission of stream from the document camera 50, receives the stream transmitted in Step S250, applies image processing to the stream with the image processor 32 to generate display image data, and executes the projection of the display image data (Step S192). Thereafter, the projector control unit 20 ends the process at the time of connection. After the execution of Step S250, the document camera control unit 70 ends the process at the time of connection.

In the embodiment, the camera head 58 (photoelectric conversion element provided in the camera head 58, in a more limited sense), the arm 56, and the arm open/close detection unit 75 respectively correspond to an "image pickup unit", a "movable holding unit", and a "state detection unit" that are constituent elements of the invention. The control unit 70, the circuit control unit 77, and the connection/disconnection switching process executed by the control unit 70 correspond to a "control unit" that is a constituent element of the invention.

3. Operation and Effect

In the thus configured projector system 100 of the embodiment, a worker can switch the arm 56 between the imaging state and the non-imaging state by moving the arm 56 in the document camera 50. The arm open/close detection unit 75 detects in which of the states the arm 56 is. When it is determined that the arm 56 is in the non-imaging state, the control unit 70 operates the circuit control unit 77 to bring the data line between the document camera 50 and the projector 10 into the disconnected state logically. Therefore, when the arm 56 is in the non-imaging state while being folded, an image signal output from the document camera 50 is not transmitted to the projector 10. Accordingly, it is possible to prevent an image not desired by a user from being displayed. In addition, unnecessary electric power is not consumed even when a state where the document camera 50 and the projector 10 are connected to each other via the USB cable 90 is maintained with the arm 56 being folded.

In the projector system 100 of the embodiment, after the data line between the document camera 50 and the projector 10 is logically connected, communication due to the USB interface is immediately established. Further, when the projector 10 is in the standby state, the power of the projector 10 is automatically turned on. Accordingly, the workability is excellent.

4. Modifications

The invention is not limited to the embodiment and the modification thereof but can be implemented in various forms in a range not departing from the gist thereof. For example, the invention can be modified as follows.

(1) In the embodiment, the arm 56 of the document camera 50 is configured to be rotatable at the connection portion with the arm mounting unit 62 and extendable and contractible in length, so that the arm 56 can be folded. However, the arm 56 is not necessarily limited to this configuration. Any configuration is possible as long as the arm can be folded from the imaging state where a subject can be imaged. For example, the arm can adopt a so-called two-joint arm configuration that is rotatable at two points, that is, the mounting unit to the base and the central part in the longitudinal direction.

(2) In the embodiment, the circuit control unit 77 is disposed on the document camera 50 side. Instead thereof, however, the circuit control unit 77 may be disposed on the projector 10 side. That is, the detection result of the arm open/close detection unit may be transmitted to the projector side, and the document camera 50 and the projector 10 may be connected/disconnected to/from each other on the projector side based on the transmission result.

(3) In the embodiment, the circuit control unit 77 connects/disconnects the pull-up resistor connected to the data line of the USB cable to thereby connect/disconnect the document camera 50 and the projector 10 to/from each other. Instead thereof, however, the document camera and the projector may be connected/disconnected by another method in which an analog switch is disposed on the data line to electrically connect/disconnect the document camera and the projector.

(4) In the embodiment, the document camera 50 is used as an image input apparatus. Instead thereof, however, another image input apparatus including an image pickup unit, such as a web camera, digital still camera, or video camera, for example, may be used.

(5) In the embodiment, the projector 10 that projects an image on the external screen SC is used as an image display apparatus. Instead thereof, however, a projection television including a screen and a projector that projects an image on the back side of the screen may be used. Further, the invention is not limited to a projector. The projector may be replaced with various image display apparatuses such as a display device.

(6) In the embodiment, the document camera 50 as an image input apparatus and the projector 10 as an image display apparatus are connected to each other via the USB cable 62. Instead thereof, however, they may be connected to each other via another cable such as a LAN cable. In addition, an image input apparatus and an image display apparatus may be connected via radio by using a wireless USB or the like.

(7) In the embodiment, in the process at the time of connection executed by the projector, when the projector 10 is in the standby state, the power of the projector 10 is automatically turned on. However, a configuration may be further added in which it is confirmed whether or not a current source (current input source) of the projector is the document camera, and an input source is switched to the document camera when the current source is not the document camera. According to this configuration, a current source can be automatically switched to the document camera when the current source is a video tape recorder, a DVD player, or the like other than the document camera, which is more excellent in workability.

(8) In the embodiment, a part of the configuration realized by hardware may be replaced by software. Conversely, a part of the configuration realized by software may be replaced by hardware.

What is claimed is:

1. An image display system comprising:
    an image input apparatus;
    and an image display apparatus that is connected with the image input apparatus and displays an image obtained by the image input apparatus,
    the image input apparatus including:
    an image pickup unit that images a subject,
    a movable holding unit that holds the image pickup unit and can be selectively brought into an imaging state where the subject can be imaged and a non-imaging state where the subject is not imaged when the entire length of the movable holding unit is shortened to the shortest length without detaching the image pickup unit from the movable holding unit,
    a state detection unit that detects whether the movable holding unit is in the imaging state or the non-imaging state;
    and a control unit that brings the image input apparatus and the image display apparatus into a disconnected state where a transmission path for transferring data between the image input apparatus and the image display apparatus is logically disconnected when the state detection unit determines that the movable holding unit is in the non-imaging state, and brings the image input apparatus and the image display apparatus into a connected state where the transmission path is logically connected when the state detection unit determines that the movable holding unit is in the imaging state.

2. The image display system according to claim 1, wherein the image input apparatus and the image display apparatus are connected to each other via a USB cable,
    the image input apparatus includes the control unit, and
    the control unit includes a circuit control unit that disconnects a pull-up resistor connected to a data line of the USB cable to realize the disconnected state and connects the pull-up resistor to realize the connected state.

3. The image display system according to claim 1, wherein the control unit includes a USB communication establishing unit that establishes communication with the image display apparatus by applying a USB standard when it is determined that it is a timing in which the movable holding unit is switched from the non-imaging state to the imaging state, and after the image input apparatus and the image display apparatus are switched to the connected state.

4. The image display system according to claim 3, wherein an image display apparatus control unit includes a standby state determination unit that determines whether or not the image display apparatus is in a standby state, and an activation unit that switches the image display apparatus from the standby state to an on state when the standby state determination unit determines that the image display apparatus is in the standby state.

5. The image display system according to claim 1, wherein the image input apparatus is a document camera, and
    the image display apparatus is a projector.

6. An image input apparatus that inputs an image and causes an image display apparatus to display the image, comprising:
    an image pickup unit that images a subject;
    a movable holding unit that holds the image pickup unit and can be selectively brought into an imaging state where the subject can be imaged and a non-imaging state where the subject is not imaged when the entire length of the movable holding unit is shortened to the shortest length without detaching the image pickup unit from the movable holding unit;
    a state detection unit that detects whether the movable holding unit is in the imaging state or the non-imaging state;
    and a control unit that brings the image input apparatus and the image display apparatus into a disconnected state where a transmission path for transferring data between the image input apparatus and the image display apparatus is logically disconnected when the state detection unit determines that the movable holding unit is in the non-imaging state, and brings the image input apparatus and the image display apparatus into a connected state where the transmission path is logically connected when the state detection unit determines that the movable holding unit is in the imaging state.

7. A method for controlling an image input apparatus that inputs an image and causes an image display apparatus to display the image, comprising:
providing an image pickup unit that images a subject;
providing a movable holding unit that holds the image pickup unit and can be selectively brought into an imaging state where the subject can be imaged and a non-imaging state where the subject is not imaged when the entire length of the movable holding unit is shortened to the shortest length without detaching the image pickup unit from the movable holding unit;
determining whether the movable holding unit is in the imaging state or the non-imaging state;
and bringing the image input apparatus and the image display apparatus into a disconnected state where a transmission path for transferring data between the image input apparatus and the image display apparatus is logically disconnected when it is determined that the movable holding unit is in the non-imaging state, and bringing the image input apparatus and the image display apparatus into a connected state where the transmission path is logically connected when it is determined that the movable holding unit is in the imaging state.

8. The controlling method according to claim 7, further comprising:
providing a connecting unit that connects the image input apparatus and the image display apparatus with a USB cable;
disconnecting a pull-up resistor connected to a data line of the USB cable to realize the disconnected state when it is determined that the movable holding unit is in the non-imaging state; and
connecting the pull-up resistor to realize the connected state when it is determined that the movable holding unit is in the imaging state.

9. The image display system according to claim 1, wherein
the movable holding unit pivots in relation to a base to bring the movable holding unit into the imaging state and the non-imaging state.

10. The image display system according to claim 9, wherein
when the image input apparatus and the image display apparatus are in the disconnected state they are physically connected.

11. The image input apparatus according to claim 6, wherein
the movable holding unit pivots in relation to a base to bring the movable holding unit into the imaging state and the non-imaging state.

12. The image input apparatus according to claim 11, wherein
when the image input apparatus and the image display apparatus are in the disconnected state they are physically connected.

13. The method for controlling an image input apparatus according to claim 7, wherein
the movable holding unit pivots in relation to a base to bring the movable holding unit into the imaging state and the non-imaging state.

14. The method for controlling an image input apparatus according to claim 13, wherein
when the image input apparatus and the image display apparatus are in the disconnected state they are physically connected.

15. The image display system according to claim 1, wherein
the non-imaging state occurs when the movable holding unit is shortest.

16. The image display system according to claim 1, wherein
the state detection unit is built into a mounting unit for the movable holding unit.

17. The image input apparatus according to claim 6, wherein
the non-imaging state occurs when the movable holding unit is shortest.

18. The image input apparatus according to claim 6, wherein
the state detection unit is built into a mounting unit for the movable holding unit.

19. The controlling method according to claim 7, wherein
the non-imaging state occurs when the movable holding unit is shortest.

20. The controlling method according to claim 7, wherein
the state detection unit is built into a mounting unit for the movable holding unit.

* * * * *